（12） United States Patent
Berkner et al.

(10) Patent No.: US 8,869,023 B2
(45) Date of Patent: Oct. 21, 2014

(54) CONVERSION OF A COLLECTION OF DATA TO A STRUCTURED, PRINTABLE AND NAVIGABLE FORMAT

(75) Inventors: Kathrin Berkner, Los Altos, CA (US); Gregory J. Wolff, Palo Alto, CA (US); Michael D. Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1321 days.

(21) Appl. No.: 11/834,418

(22) Filed: Aug. 6, 2007

(65) Prior Publication Data

US 2009/0044106 A1 Feb. 12, 2009

(51) Int. Cl.
*G06F 17/00* (2006.01)
*G06F 17/22* (2006.01)
*G06F 17/21* (2006.01)
*G06F 17/24* (2006.01)

(52) U.S. Cl.
CPC .............. *G06F 17/211* (2013.01); *G06F 17/24* (2013.01); *G06F 17/2247* (2013.01)
USPC ........... 715/234; 715/200; 715/201; 715/209; 715/255; 715/273; 715/274

(58) Field of Classification Search
CPC .............. G06F 17/211; G06F 17/2247; G06F 17/22474
USPC .......... 715/200, 201, 209, 234, 255, 273, 274
See application file for complete search history.

(56) References Cited

U.S. PATENT DOCUMENTS

| 6,112,203 | A | 8/2000 | Bharat et al. |
| 6,738,841 | B1 | 5/2004 | Wolff |
| 6,856,415 | B1 * | 2/2005 | Simchik et al. .............. 358/1.15 |

(Continued)

FOREIGN PATENT DOCUMENTS

| JP | H04321144 | 11/1992 |
| JP | H09325957 | 12/1997 |
| JP | 2006-268771 | 5/2006 |

OTHER PUBLICATIONS

Wikipedia, "Wiki", taken online Apr. 26, 2011 from Internet Archive Wayback Machine which does the "Wiki" web page was available online on Jul. 23, 2006, Screenshot, pp. 1-6 + one page from Wayback Machine (8 pages total).*

(Continued)

*Primary Examiner* — Cesar Paula
*Assistant Examiner* — David Faber
(74) *Attorney, Agent, or Firm* — Patent Law Works LLP

(57) ABSTRACT

A system for converting a collection of data to a structured, printable and navigable document includes: an analyzer and a layout unit. The analyzer is coupled to receive a data collection source such as a web page associated with a wiki and other user parameters, and generates a representation of content associated with the data collection source. The output of the analyzer is coupled to an input of the layout unit to provide the representation of content. The layout unit is also coupled to receive a style sheet or other user preferences. The linearizer of the layout unit retrieves the necessary content using the representation of content. The retrieved content is then formatted by the layout selector of the layout unit to generate a paginated document and metadata. This output can then be printed on any conventional printer or manipulated and interacted with using applications or a web browser.

20 Claims, 17 Drawing Sheets

(56) References Cited

U.S. PATENT DOCUMENTS

| | | | |
|---|---|---|---|
| 7,383,498 B1* | 6/2008 | Hickl et al. | 715/235 |
| 7,412,689 B1* | 8/2008 | Quinn et al. | 717/107 |
| 7,568,154 B2* | 7/2009 | Salesin et al. | 715/243 |
| 7,620,633 B1* | 11/2009 | Parsons et al. | 1/1 |
| 7,810,024 B1* | 10/2010 | Goldman | 715/234 |
| 7,853,871 B2* | 12/2010 | Simons et al. | 715/238 |
| 2003/0050931 A1* | 3/2003 | Harman et al. | 707/100 |
| 2003/0229854 A1* | 12/2003 | Lemay | 715/513 |
| 2004/0133848 A1* | 7/2004 | Hunt et al. | 715/500 |
| 2004/0148571 A1* | 7/2004 | Lue | 715/514 |
| 2006/0167907 A1* | 7/2006 | Jones | 707/100 |
| 2006/0282758 A1* | 12/2006 | Simons et al. | 715/500 |
| 2006/0287989 A1 | 12/2006 | Glance | |
| 2007/0112764 A1* | 5/2007 | Yih et al. | 707/5 |
| 2007/0130185 A1* | 6/2007 | Miller et al. | 707/101 |
| 2007/0130509 A1 | 6/2007 | Gombert et al. | |
| 2007/0239704 A1* | 10/2007 | Burns et al. | 707/5 |
| 2007/0299867 A1* | 12/2007 | Baldwin et al. | 707/103 R |
| 2008/0010387 A1* | 1/2008 | Curtis et al. | 709/246 |
| 2008/0010586 A1* | 1/2008 | Betancourt et al. | 715/221 |
| 2008/0033996 A1* | 2/2008 | Kesari | 707/104.1 |

OTHER PUBLICATIONS

Hegaret et al, "What is Document Object Model?", Nov. 7, 2003, W3C, p. 1-8; http://www.w3.org/TR/2003/CR-DOM-Level-3-Core-20031107/introduction. html.*

Kleinberg, J. et al., "Algorithm Design," pp. 177-183, 2006, Pearson Education, Inc.

Extended European Search Report, European Application No. 08161693.0, Jun. 5, 2009, 8 pages.

"Scroll Wiki Exporter—Confluence Atlassian Plugin Exchange," Atlassian Pty Ltd., [Online] [Retrieved on Nov. 1, 2011] Retrieved from the Internet <URL:https://plugins.atlassian.com/plugin/details/7019>, 3 pages.

* cited by examiner

Table of Contents
- 1 JPM Porting Exercise
  - 1.1 Current deliverables (all parties)
    - 1.1.0 Deliverables (last updated November 28th)
    - 1.1.1 Current Deliverables
      - 1.1.1.1 Topic 5: Porting to Windows of CIP's JPM implementation
        - 1.1.1.1.0 CIP's JPMPorting to Window page
        - 1.1.1.1.1 CRC's work to make JPM software run on Windows
          - 1.1.1.1.1.1 Strawman Plan
          - 1.1.1.1.1.2 Status
          - 1.1.1.1.1.3 TODOs
            - 1.1.1.1.1.3.1 General TODOs
            - 1.1.1.1.1.3.2 Things to be discussed
            - 1.1.1.1.1.3.4 Third Party Libraries Required for JPM software
            - 1.1.1.1.1.5 Features/bug fixes that will not be pursued at this time
            - 1.1.1.1.1.6 Remaining API to be wrapped
      - 1.1.1.2 Topic 4: Cropping areas of interest using JPM's XML controls
        - 1.1.1.2.0 testing report
      - 1.1.1.3 Topic 7: Sample SPF Demo using JPM technology
        - 1.1.1.3.0 scan_for_omission
        - 1.1.1.3.1 Implementation of Simple SPF Check For Omission
        - 1.1.1.3.2 Performance
          - 1.1.1.3.2.1 Print
          - 1.1.1.3.2.2 Scan and Crop and Check omission
        - 1.1.1.3.3 Demo Scenario Description of Scan for Omission:
        - 1.1.1.3.3.1 Image Cropping Using JPM Control File
          - 1.1.1.3.3.1.1 Open Issue
      - 1.1.1.4 Topic 2: Conversion from JPM's XML to PDF and vice versa
        - 1.1.1.4.0 jpm_to_pdf_round_trip
        - 1.1.1.4.1 Goal
        - 1.1.1.4.2 Status
        - 1.1.1.4.3 TODO
        - 1.1.1.4.4 ISSUES
    - 1.1.2 Completed or no longer current
      - 1.1.2.1 Topic 1: inline XML for SPF purpose into the JPM's XML
      - 1.1.2.2 Topic 3: Codestream for Images Inside JPM's XML
      - 1.1.2.3 Topic 6: LuratechJBIG2 package transfer on Debian VM
      - 1.1.2.4 Topic 8: using JPEG2000 for image datasources
      - 1.1.2.5 Topic 9: printing fast and with good quality
    - 1.2 Memos and Minutes
      - 1.2.0 meeting on the 2nd of November
      - 1.2.0 meeting on the 21st
      - 1.2.1 Meeting on JPM to Java exercise
        - 1.2.1.1 TODOs
        - 1.2.1.2 Draft Design
        - 1.2.1.3 Open Issues and Follow ups
      - 1.2.0 CIP done list in week of 9/25 -9/29
      - 1.2.0 Packages delivered to ABC from CIP
      - 1.2.0 CIP end of project notes
      - 1.2.1 CIP End of Project Notes
        - 1.2.1.1 Things to complete
        - 1.2.1.2 Possibly easy things that will not be completed
        - 1.2.1.3 Probably hard things that will not be completed
          - 1.2.1.3.1 CIP Initiated items, not ABC requests
        - 1.2.1.4 Fundamental limitations
        - 1.2.1.5 Random documentation
    - 1.3 Core Functionality Needed to Manipulate Compound Documents
      - 1.3.1 High Level
      - 1.3.2 Deliverables within JPM context
      - 1.3.3 Features that will not be pursued at this time
  - 2 Related source code and documents
    - 2.0 Java Wrapper Project code
      - 2.1 Java Source Code
        - 2.1.1 WARNING
        - 2.1.2 Code location
        - 2.1.3 Contacts

1 JPM Porting Exercise

This page is to document ABCs efforts into porting the JPM implementation from C to Java by means of JNDI wrapping. The reader should note that this is not an actual code porting from one programming language to the other but simply an exercise on how to make a subset of JPM available in Java within the specific context of OSPJ project.

1.1 Current deliverables (all parties)
- Deliverables (last updated November 28th)
- 1.1.0 Deliverables (last updated November 28th) — 1102

*Figure 11A*

Replacement Sheet

■1. JPM Porting Exercise

This page is to document ABC's efforts into porting the JPM implementation from C to Java by means of JNDI wrapping. The reader should note that this not an actual code porting from one programming language to the other but simply an exercise on how to make a subset of JPM available in Java within the specific context of OSPJ project.

■1.1 Current deliverables (all parties)
W Deliverables (last updated November 28th)
W *1.1.0 Deliverables (last updated November 28th)*

Table of Contents
- JPM Porting Exercise
  o Current deliverable (all parties)
  o Memos and Minutes
  o Core Functionality Needed to Manipulate Compound Documents
    • High level
    • Deliverables within JPM context
    • Features that will not be pursued at this time
  ■ Related source code and documents

■1.1.1 Topic 5: Porting to Windows of CIP's JPM Implementation

Summary: Please see
W CIP's JPMPorting to Window page
W→ ■ *1.1.1.0 CIP's JPMPorting to Window page*

In this page we only list open tasks and information on their current status. Each RII member involved is encouraged to update, edit and correct as deemed necessary.

(11/28/06: Ed reordered these topics. Is this order logical?)

Table of Contents
- Current Deliverables
  o Topic 5: Porting to Windows of CIP's JPM implementation
  o Topic 4: Cropping areas of interest using JPM's XML controls
  o Topic 7: Sample SPF Demo using JPM technology
  o Topic 2: Conversion from JPM's XML to PDF and viceversa
  ■ Completed or no

■1.1.1.4.1 Goal
Provide APIs for ABC Java code to convert jpm to pdf, and convert pdf back to jpm.

■1.1.1.4.2 Status
At the start of this project the following programs existed:
1. jpm_to_pdf is a Java program that converts a jpm file to a PDF file under the Ricoh profile by calling itext (Java APIs for creating PDF) and JNI of JPM C++ library. This program has been tested on both Debian and Mac OSX using the SPF demo forms.
2. pdfvalidate is another java program that validates a PDF file against the Ricoh profile. It outputs some log info that includes the offset value of the skeleton JPM contained in the PDF file.
3. jpmdecode2 supports -initial_offset option to directly decode the skeleton JPM from the input PDF file.

In directory jpm_pdf_java/com/ ricoh/ rii/jpm JpmEncoder.java and JpmDecoder.java is untested code that calls the same routines that jpm_to_pdf, pdfvalidate and jpmdecode2 use. The software related to pdfvalidate which finds skeleton files in PDF files has been improved to find the length of skeleton files.

■1.1.1.4.3 TODO
- Make an un-skeleton function for PDF > XML so that the output codestreams and XML description are similar to the input for PDF > XML instead of describing the JPM-in-PDF structure.
- Test JpmEncoder.java and JpmDecoder once Dan is finnished wrapping the required C++ software.

■1.1.1.4.4 ISSUES
- The jpm_to_pdf program has a problem where its output is not consistent when run multiple times with the same input. It is not known if jpmEncoder.java will have the same problem or not. If it does, then either it needs to be fixed or way of testing that accounts for the inconsistency is needed.
- The jpm_to_pdf program uses a class makeXMLStream in JPMtoPDF.java. An XML parser in this class fetches external DTDs. The current automated tests depend not only are particular local files but also on a RSS DTD from non-Ricoh web site http://my.netscape.com. For ABC's use, Schwartz suggests avoiding problems by avoiding having a DTD in XML in an XML box. (Schwartz doesnt know if the PDF standard requires validatable XML or not.)

Proposed signatures:

Table of Contents
- Goal
  o Status
  o TODO
  o ISSUES

*Figure 11D*

1.1.1.4.1 Goal

Provide APIs for ABC Java code to convert jpm to pdf, and convert pdf back to jpm.

1.1.1.4.2 Status

At the start of this project the following programs existed:

1. jpm_to_pdf is a java program that converts a jpm file to a PDF file under the Ricoh profile by calling itext (Java APIs for creating PDF) and JNI of JPM C++ library. This program has been tested on both Debian and Mac OSX using the SPF demo forms.
2. Pdfvalidate is another java program that validates a PDF file against the Ricoh profile. It outputs some log info that includes the offset value of the skeleton JPM from the input PDF file.
3. jpmdecode2 supports -initial_offset option to directly decode the skeleton JPM from the input PDF file.

In directory jpm_pdf_java/com/ricoh/rii/jpm JpmEncoder.java and JpmDecoder.java is untested code that calls the same routines that jpm_to_pdf, pdfvalidate and jpmdecode2 use. The software related to pdfvalidate wich finds skeleton files in PFD files has been improved to find the length of skeleton files.

1.1.1.4.3 TODO

- Make an un-skeleton function for PDF > XML so that the output codestreams and XML description are similar to the input for XML > PDF instead of describing the JPM-in-PDF struncture.
- Test JpmEncoder.java and JpmDecoder once Dan is finnished wrapping the required C++ software.

1.1.1.4.4 ISSUES

- The jpm_to_pdf program has a problem where its output is not consistent when run multiple times with the same input. It is not known if JpmEncoder.java will have the same problem or not. If it does, then either it needs to be fixed or way of testing that accounts for the inconsistency is needed.
- The jpm_to_pdf program uses a class makeXMLStream in JPMtoPDF.java. An XML parser in this class fetches external DTDs. The current automated tests depend not only are particular local files but also on a RSS DTD from non-Ricoh web site http://my.netscape.com. For ABCs use, Schwartz suggest avoiding problems by avoiding having a DTD in XML in an XML box. (Schwartz doesn't know if the PDF standard required validatable XML or not.)

Proposed signatures:

*Figure 11E*

CONVERSION OF A COLLECTION OF DATA TO A STRUCTURED, PRINTABLE AND NAVIGABLE FORMAT

BACKGROUND OF THE INVENTION

The present invention relates to processing techniques for converting a collection of data to a structured, printable and navigable form. More particularly, the present invention relates to systems and methods for converting wiki content into a formatted and paginated document.

A wiki is a website, collection of web pages or similar system that allows visitors to add, remove and edit content (the definition from wikipedia is a wiki is a website which can be directly edited by anyone with access to it.). Wikis have become a common tool or collaborative technology for organizing and communicating information. They are used in a variety of different environments by individuals, communities and corporations. They are used in the web-consumer world by individuals and in the corporate world as intuitive project management tools. Furthermore, the famous Wikipedia wiki is its own network or community. This structure is acceptable when the data is access via a web browser and users are accustomed to navigating over different pages and selecting hypertext links to see the data or different portions of it.

For most uses like project management wikis, users expect functionality closer to traditional documents. Only a few people contribute and content is likely to be organized in a hierarchical fashion following conventional document structure, such as consisting of headings, paragraphs, lists, etc. For tasks such as learning or reviewing content, it is beneficial to have the wiki content available on paper. However, the prior art does not provide a method for viewing such collections of documents in a format similar to paper. Rather, a web browser is used to navigate over the content. More importantly, there is not a simple way to print a document that is representative of the wiki being reviewed. Instead, the user must use a cumbersome process in which they navigate to the webpage they are reviewing and then select print. In many instances, the printed page is not completely printed, paginated in with only small portions of text on each page, or in other formats that are difficult to use. Furthermore, the prior art does not provide any mechanisms to address these issues.

SUMMARY OF THE INVENTION

The present invention overcomes the deficiencies of the prior art with a system for converting a collection of data to a structured, printable and navigable document. The system is particularly advantageous because it allows wiki content to be transformed into a format that is more easily understandable, navigable and printable. In one embodiment, the system of the present invention includes: an analyzer and a layout unit. The analyzer is coupled to receive a data collection source such as a web page associated with a wiki and other user parameters, and to generate a representation of content associated with the data collection source. The output of the analyzer is coupled to an input of the layout unit to provide the representation of content. The layout unit is also coupled to receive a style sheet or other user preferences. The layout unit in one embodiment further comprises a linearizer and a layout selector. The linearizer of the layout unit retrieves the necessary content using the representation of content. The retrieved content is then linearized and formatted by the layout selector of the layout unit to generate a paginated document and metadata. This output can then be printed on any conventional printer. The output can also be manipulated and interacted with using applications or a web browser. The present invention also includes methods such as a method for converting a collection of data to a structured, printable and navigable format.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIGS. 11A-11E are graphical representations of printed pages generated in accordance with the present invention.

DETAILED DESCRIPTION OF PREFERRED EMBODIMENTS

Figure 1:
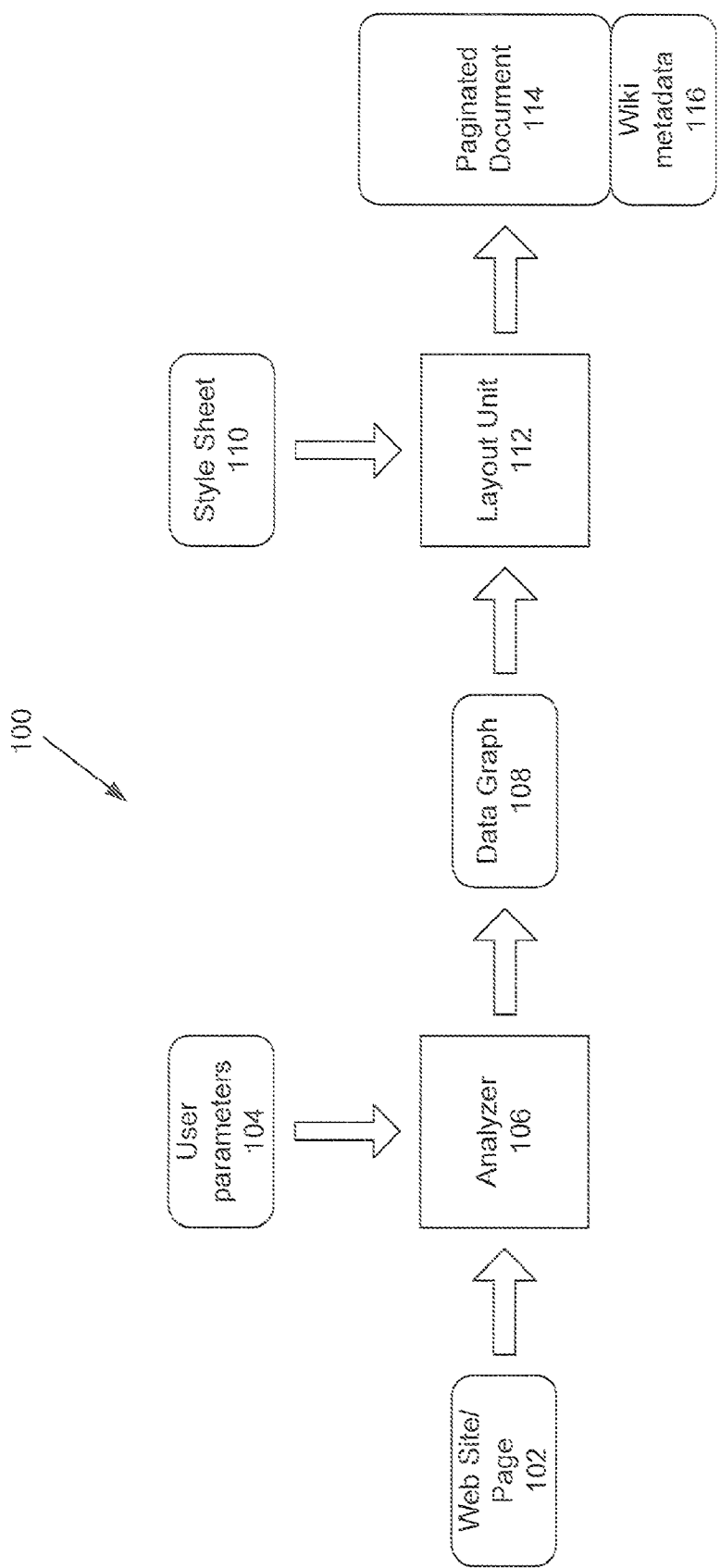
FIG. 1 is a functional diagram of an embodiment of a system for converting a collection of data to a structured, printable and navigable format in accordance with present invention.

A system for converting a collection of data to a structured, printable and navigable document is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in on embodiment below with reference to a printer driver. However, the present invention applies to any type of computing device that can receive a collection of data (possibly index by multiple parameters) and produce a structured, printable and navigable document.

Furthermore, the present invention is also described below primarily in the context of collection of data being a wiki. Wiki content is located in a parameter space whose dimensionality is more complex than that of conventional authored documents or web pages. Conventional documents have a hierarchical content structure including title, sections, paragraphs, section numbering and page numbering. The structure of the web is given through links pointing from one web page to another. Wikis structure combines those two structures and adds a time and an author dimension to it. Another possibility is to add a context dimension represented e.g. through keywords to it. As a result, wiki content is located in a 5-dimensional space: time, author, wiki linkage, content structure, and context. Those skilled in the art will recognize that the present invention may be used in any number of other collections of data and wikis are used only by way of example. For example, in one alternate embodiment, the present invention can be used as for conversion of blog data into structured, printable, and navigable document. Currently blog entries are strictly ordered in reverse chronological order. That means each node in the tree needs to be extracted and no analysis of a graph is performed (e.g., see tabblo.com). In yet another embodiment, the present invention can be used for discussion forums and email archives in which the source material has: a) implicit or explicit links between individual items such as reference numbers, email addresses (sender, receiver), b) distinct identifiers for each item, and c) a history of the modifications to the items (and/or similar data such as access times).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Referring now to FIG. 1, an embodiment of the system 100 of the present invention for converting a collection of data to a structured, printable and navigable document is shown. In this embodiment, the system 100 comprises: an analyzer 106 and a layout unit 112. The analyzer 106 is coupled to receive a data collection source 102 such as a web page associated with a wiki and other user parameters 104, and to generate a representation 108 of content associated with the data collection source. In this embodiment, the analyzer 106 outputs a data graph 108 to represent the content of the wiki. The output of the analyzer 106 is coupled to an input of the layout unit 112 to provide the representation 108 of content. The layout unit 112 is also coupled to receive a style sheet or other user preferences 110. The layout unit 112 in one embodiment further comprises a linearizer 316 and a layout selector 318 (See FIG. 3). The linearizer 316 retrieves the necessary content using the data graph 108. The retrieved content is then linearized and formatted by the layout selector 318 to generate a paginated document 114 and metadata 116. This output can then be printed on any conventional printer (not shown). The output can also be manipulated and interacted with using applications or a web browser.

The system 100 of the present invention is particularly advantageous because it provides a number of benefits. First, it provides a method to convert a collection of data into a format that has a paper-centric presentation structure. For example, the output can be viewed or printed in a format that has a table of content, a hierarchical structure or even section numbering. Second, it provides a method to filter the collection of data based on user preferences and other criteria. For example, the data presented in the paper like structure can be based on recent changes made to the wiki by a particular person, content, time, author, context, etc. Third, it creates a resulting structure that has a paper like organizational structure and can include navigation capabilities or information.

Sample Output

Figure 4:
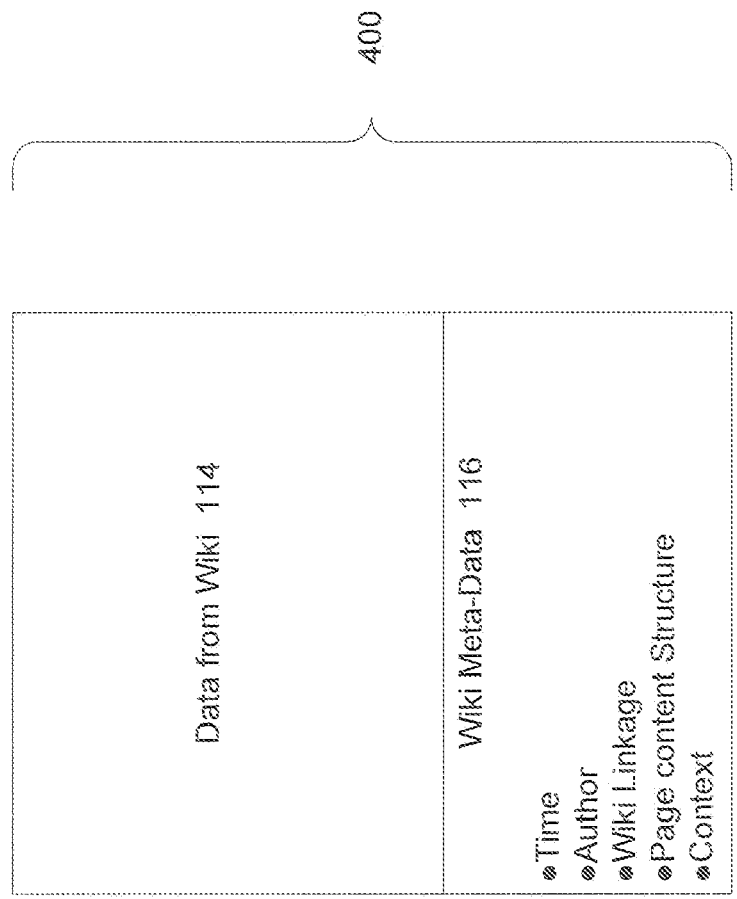
FIG. 4 is a graphical representation of an example structure for output of the system of the present invention.

FIG. 4 is a graphical representation of an example structure 400 for output of the system 100 of the present invention. The structure includes data 114 from the wiki and metadata 116 associated with the wiki address. The wiki data 114 is text, images or video on the web page or related web pages. The wiki metadata 116 includes additional information such as the author of the content, the time the content was added, link information (internal, external or navigation links), page content structure of the wiki such as (section heading, paragraph, bullet list, etc.) and context such a keywords, topics, tags).

System Embodiments

Figure 2:
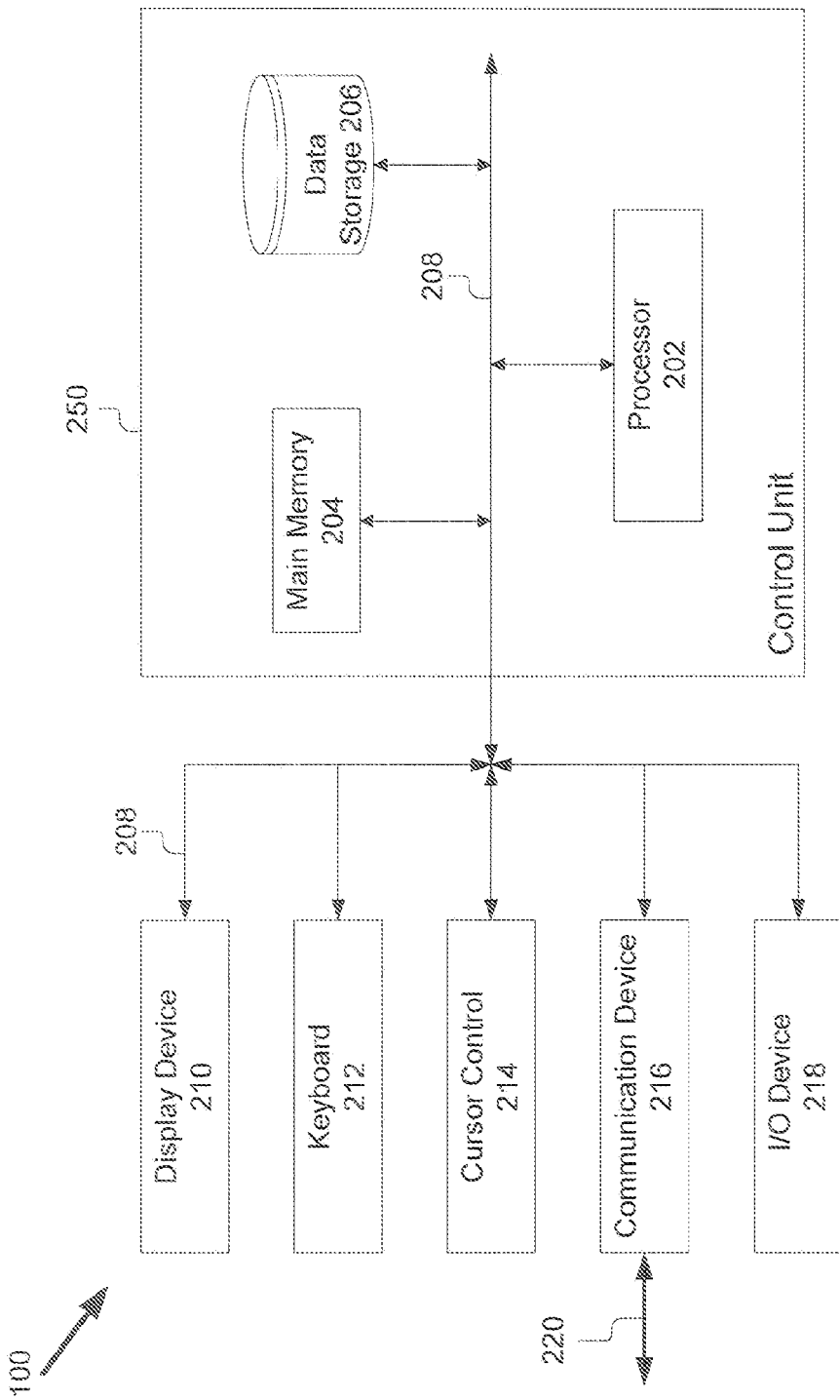
FIG. 2 illustrates a block diagram of a system configured in accordance with an embodiment of the present invention.

Referring now also to FIG. 2, a functional block diagram of the system 100 configured in accordance with an embodiment of the present invention is shown. The system 100 preferably comprises a control unit 250, a display device 210, an input device 212, cursor control 214, a communication device 216, and one or more input/output (I/O) devices 218.

The control unit 250 comprises an arithmetic logic unit, a microprocessor, a general purpose computer or some other information appliance equipped to provide electronic display signals to display device 210. In one embodiment, the control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, drawing applications, word processing applications, electronic mail applications, financial applications and web browser applications.

Still referring to FIG. 2, the control unit 250 is shown including processor 202, main memory 204 and data storage device 206, all of which are communicatively coupled to system bus 208.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 stores instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 is described in more detail below with reference to FIG. 3.

Data storage device 206 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 208 represents a shared bus for communicating information and data throughout control unit 250. System bus 208 may represent one or more buses including an industry standard architecture (ISA) bus, a peripheral component interconnect (PCI) bus, a universal serial bus (USB), or some other bus known in the art to provide similar functionality. Additional components coupled to control unit 250 through system bus 208 include the display device 210, the input device 212, cursor control 214, the communication device 216 and the I/O device(s) 218.

Display device 210 represents any device equipped to display electronic images and data as described herein. In one embodiment, the display device 210 is a liquid crystal display (LCD) and light emitting diodes (LEDs) to provide status feedback, operation settings and other information to the user. In other embodiments, the display device 210 may be, for example, a cathode ray tube (CRT) or any other similarly equipped display device, screen or monitor. In one embodiment, display device 210 is equipped with a touch screen and/or includes a digitizer in which a touch-sensitive, transparent panel covers the screen of display device 210.

In one embodiment, the input device 212 is a keyboard. The keyboard can be a QWERTY keyboard, a key pad, or representations of such created on a touch screen. Cursor control 214 represents a user input device equipped to communicate positional data as well as command selections to processor 202. Cursor control 214 may include a mouse, a trackball, a stylus, a pen, a touch screen, cursor direction keys or other mechanisms to cause movement of a cursor.

Communication device 216 links control unit 250 to a network 220 that may include multiple processing systems and in one embodiment is a network controller. The network of processing systems may comprise a local area network (LAN), a wide area network (WAN) (e.g., the Internet), and/or any other interconnected data path across which multiple devices may communicate. The control unit 250 also has other conventional connections to other systems such as a network for distribution of files (media objects) using standard network protocols such as TCP/IP, http, https, and SMTP as will be understood to those skilled in the art.

One or more I/O devices 218 are coupled to the bus 208. These I/O devices may be part of the other systems (not shown). For example, the I/O device 218 can include an image scanner for capturing an image of a document. The I/O device 218 may also includes a printer for generating documents. The I/O device 218 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that system 100 may include more or less components than those shown in FIG. 2 without departing from the spirit and scope of the present invention. For example, system 100 may include additional memory, such as, for example, a first or second level cache, or one or more application specific integrated circuits (ASICs). Further, the system 100 may include multiple data buses rather than the single bus 208. Multiple buses allow fast transfer of image data from and between the components of the system 100, and simultaneous data transfer of user interface information to a display device, for example. Similarly, additional input/output devices 218 may be coupled to control unit 250 including, for example, an RFID tag reader, digital still or video cameras, or other devices that may or may not be equipped to capture and/or download electronic data to control unit 250. One or more components could also be eliminated such as the keyboard & cursor control 212.

Figure 3:
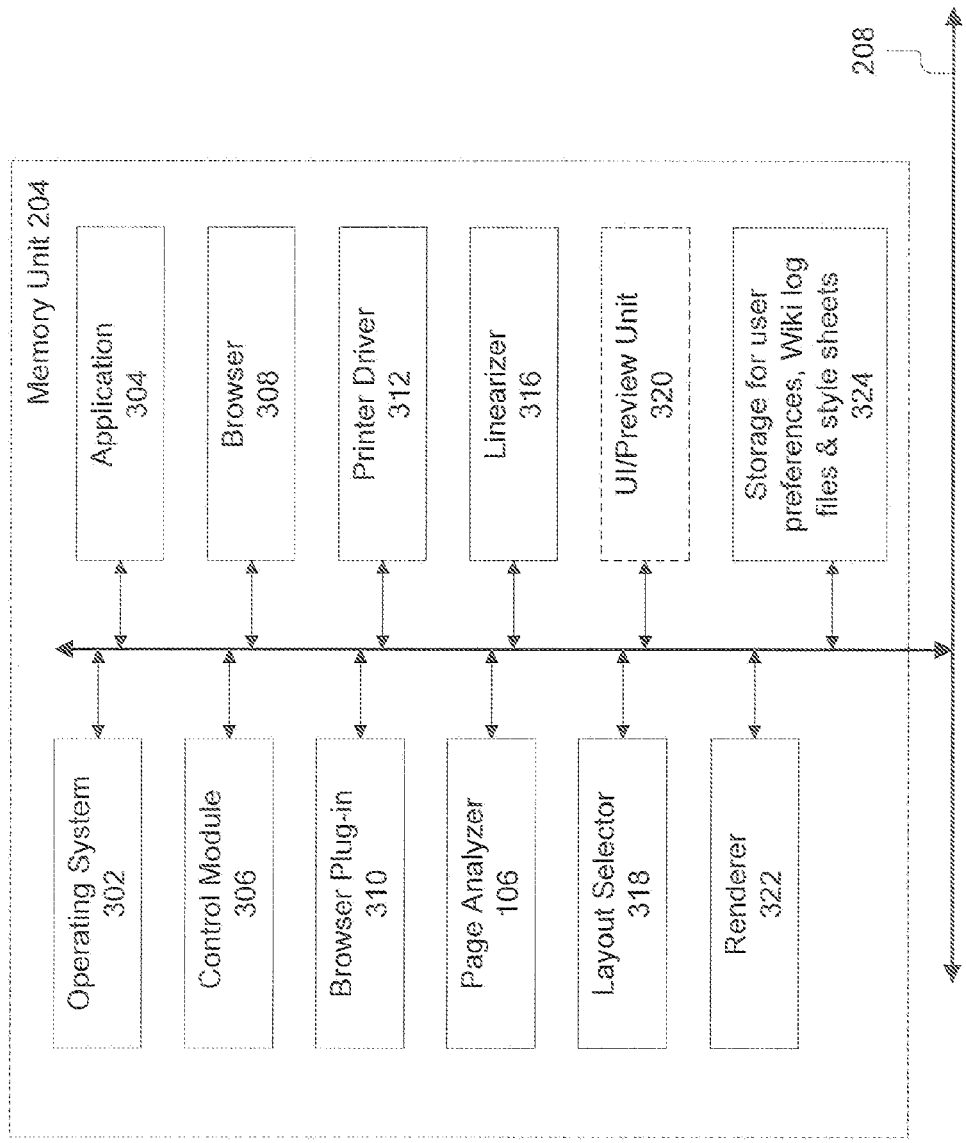
FIG. 3 illustrates a block diagram of a memory of the system of FIG. 2 configured in accordance with an embodiment of the present invention.

FIG. 3 is a block diagram of one embodiment of the memory unit 204 for the system 100. The memory unit 204 preferably comprises: an operating system 302, an application 304, a control module 306, a browser 308, a browser plug-in 210, a printer driver 312, a page analyzer 106, a linearizer 316, the layout selector 318, a user interface/preview unit 320, a renderer 322 and a storage 324 for user preferences, wiki log files and style sheets. Those skilled in the art will recognize that the memory 204 also includes buffers for storing wiki content, data graphs and other information temporarily until the output document 114 has been generated. As noted above, the memory unit 204 stores instructions and/or data that may be executed by processor 202. The instructions and/or data comprise code for performing any and/or all of the techniques described herein. These modules 302-314 are coupled by bus 208 to the processor 202 for communication and cooperation to system 100. Those skilled in the art will recognized that while the present invention will now be described as modules or portions of a memory unit 204 of a computer, the modules or portions thereof may also be stored in other media such as permanent data storage device 206 and may be distributed across a network 220 having a plurality of different computers such as in a client/server environment.

The operating system 302 is preferably a custom operating system that is accessible to user via an application interface. In an alternate embodiment, the operating system 302 is one of a conventional type such as, WINDOWS®, SOLARIS® or LINUX® based operating systems.

The memory unit 204 also includes one or more application programs 304 including, without limitation, drawing applications, word processing applications, electronic mail applications, financial applications and web browser applications.

The control module 306 is used to control the other modules of the memory 204. The control module 306 is adapted for control of and communication with the page analyzer 106, the linearizer 316, the layout selector 318, the user interface/preview unit 320, the renderer 322 and the storage 324. The operation of the control module 306 will be apparent from the description of FIG. 8 below. While the control module 306 is shown as a separate module of the memory 204, those skilled in the art will recognize that the control module 306 in another embodiment may be distributed as routines in the other modules 310-324.

The browser 308 is a conventional type such as Internet Explorer by Microsoft® or Firefox by Mozilla. The Web browser is a software application that enables a user to display and interact with text, images, and other information typically located on a Web page at a website on the World Wide Web or a local area network.

In one embodiment, the present invention can be implemented the browser plug-in (or browser extension, as in Firefox) 310. The browser plug-in 310 is a computer program that interacts with a web browser to provide a certain, usually very specific, function on demand. In such an embodiment, the functionality of the page analyzer 106, the linearizer 316, the layout selector 318, the user interface/preview unit 320, the renderer 322 or the storage 324 as will be described below would be subsumed in the browser plug-in 310. This would allow the functionality of the present invention to be used on any computer that operates a web browser.

In one embodiment, the present invention can be implemented as part of print driver 312. This embodiment will be described in more detail below with reference to FIG. 9. Again, in such an embodiment, the functionality of the page analyzer 106, the linearizer 316, the layout selector 318, the user interface/preview unit 320, the renderer 322 or the storage 324 as will be described below would be subsumed in the print driver 312.

The page analyzer 106 is software and routines for creating a representation of a selected data collection. The page analyzer 106 essentially selects content according to user or system preferences. In one embodiment, the page analyzer 106 receives a wiki address, a user preference and a wiki log file as input; and crawls certain wiki pages and creates a data graph that represents selected wiki material according to user or system preferences. The page analyzer 106 is coupled for communication with the browser 308, the linearizer 316, and the storage 324 under the direction of control module 306.

The linearizer 316 is software and routines for fetching and creating a linear representation of content. In one embodiment, the linearizer 316 takes the data graph output by the page analyzer 106 and fetches the necessary content from selected wiki pages including metadata for document and wiki navigation and then creates a linearized representation of selected wiki content including instructions for document and wiki navigation. The linearizer 316 is coupled for communication with the page analyzer 106, the browser 308, and the storage 324 under the direction of control module 306.

The layout selector 318 is software and routines for formatting the linearized content according to layout selection of user or system preference. The layout selector 318 receives the linearized content output by the linearizer 316 and formats it for printing or presentation to the user. In one embodiment, the layout selector 318 is coupled for communication with the linearizer 316, the user interface/preview unit 320, the renderer 322 and the storage 324.

As denoted by dashed lines, the system 100 may optionally include the user interface/preview unit 320. In different embodiment, the user interface/preview unit 320 is not required and may be omitted. The user interface/preview unit 320 is software and routines for receiving linearized and formatted content from the layout selector 318 and presenting it to the user. For example, the user interface/preview unit 320 takes the formatted wiki content, displays to the user and let's the user edit the user's preferences in the page analyzer 106 and layout selector 318 and reprocess the content. The user interface/preview unit 320 is coupled for communication with the user via the keyboard 212 or cursor control 214, the layout selector 318, the renderer and the storage 324.

The renderer 322 is software and routines for generating print ready data or an image. The renderer 322 may include print drivers or other information that is incorporated into its output such that the output can be processed directly. The renderer 322 is coupled to the storage 324, the layout selector 318 and may be coupled for communication with any output device via the network controller 216.

The storage 324 is storage for storing temporary output of any one of the other components of memory 204. The storage 324 may also be used as working memory for any of the other routines. The storage 324 in one embodiment stores content, user preferences, one or more wiki logs, style sheets and other data used by the present invention. The storage is coupled by bus 208 to the other components of memory 204.

Figure 5:
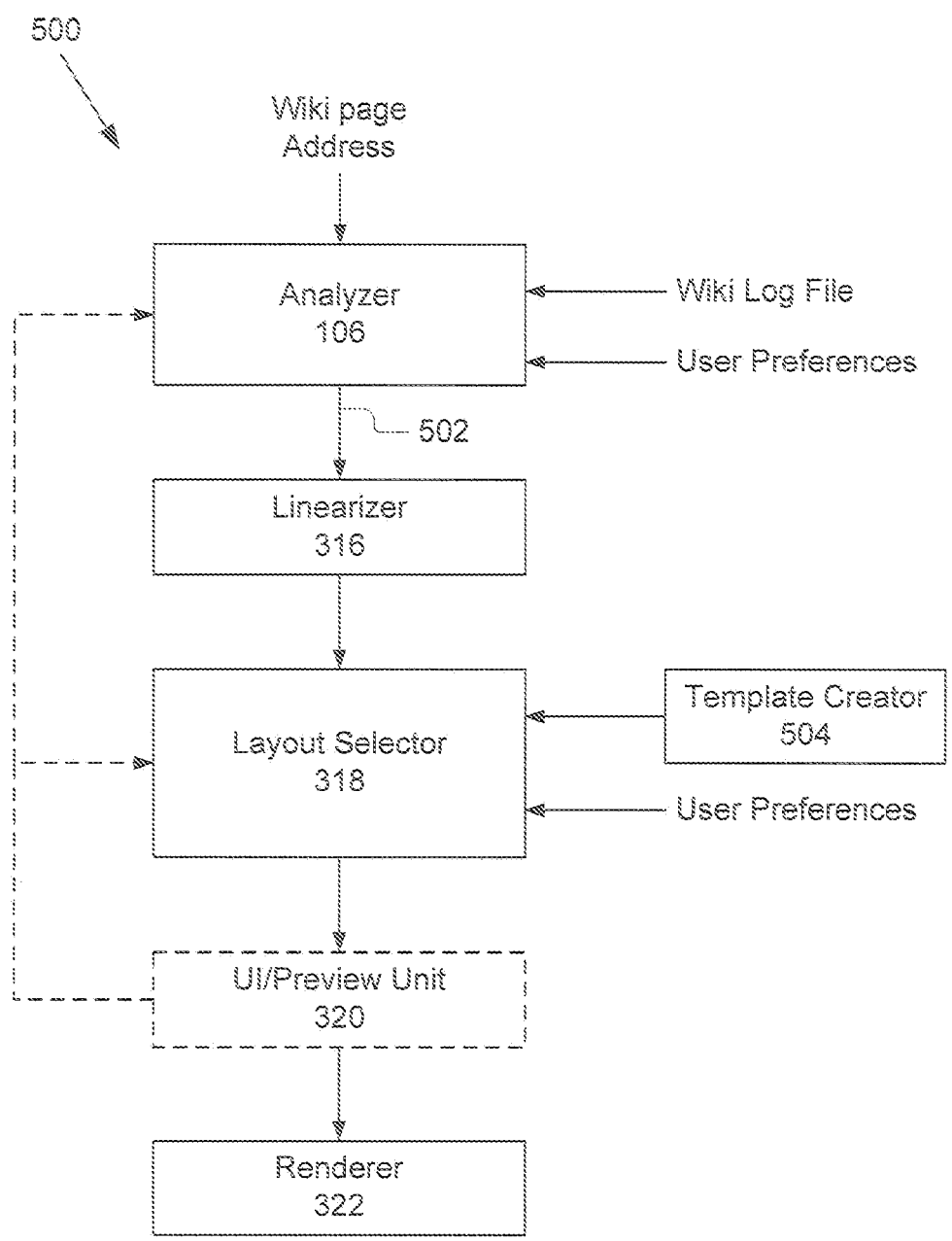
FIG. 5 is a block diagram of another embodiment of a system for converting a collection of data to a structured, printable and navigable format in accordance with the present invention.

Referring now to FIG. 5, another embodiment of the system 500 of the present invention for converting a collection of data to a structured, printable and navigable format is shown. For convenience and ease of understanding like reference numerals are used for like components having the same or similar functionality as that described above for other embodiments. This second embodiment of the system 500 includes the analyzer 106, the linearizer 316, the layout selector 318, the user interface/preview unit 320 and the renderer 322. This embodiment also includes a template creator 504, and shows the inputs to the components in more detail.

Figure 6:
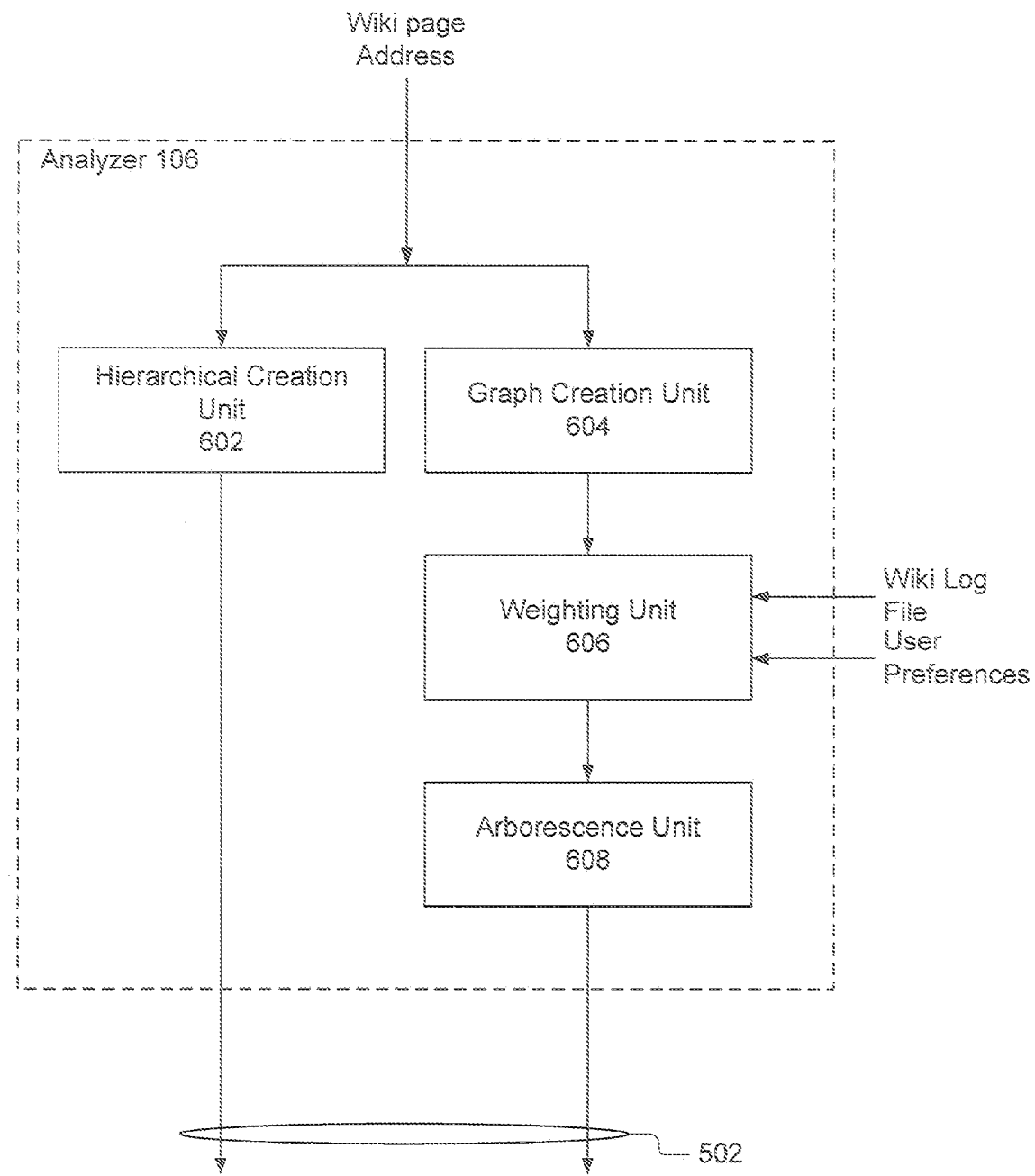
FIG. 6 is a block diagram of an embodiment of an analyzer in accordance with the present invention.

In this embodiment, the analyzer 106 has a plurality of inputs and an output. The analyzer 106 is coupled to receive a webpage address, a wiki log file and user preferences. The analyzer 106 outputs on signal line 502 a representation of the content related to the webpage address. In this embodiment, the representation is a directed graph referred to as a wiki linkage graph. Referring now also to FIG. 6, an embodiment of the analyzer 106 is described in more detail. In this embodiment, the analyzer 106 includes: a hierarchal creation unit 602, a graph creation unit 604, a weighting unit 606 and an arborescence unit 608.

The hierarchal creation unit 602 has an input coupled to receive the wiki page address. The hierarchal creation unit 602 outputs a data representing the hierarchal relationship of the input wiki page address to other content. The hierarchal creation unit 602 crawls (creates a copy of all the visited pages for later processing) the wiki page address and hypertext links at that page address. The hierarchal creation unit 602 also maintains a list of the hierarchal parent-child relationships between the pages. In contrast to the prior art, where most available crawlers just produce a list of crawled pages and not hierarchical relationships. In one embodiment, the hierarchal creation unit 602 crawls: internal wiki pages, external pages accessed via http but suppresses internal wiki navigation links.

Figure 12A:
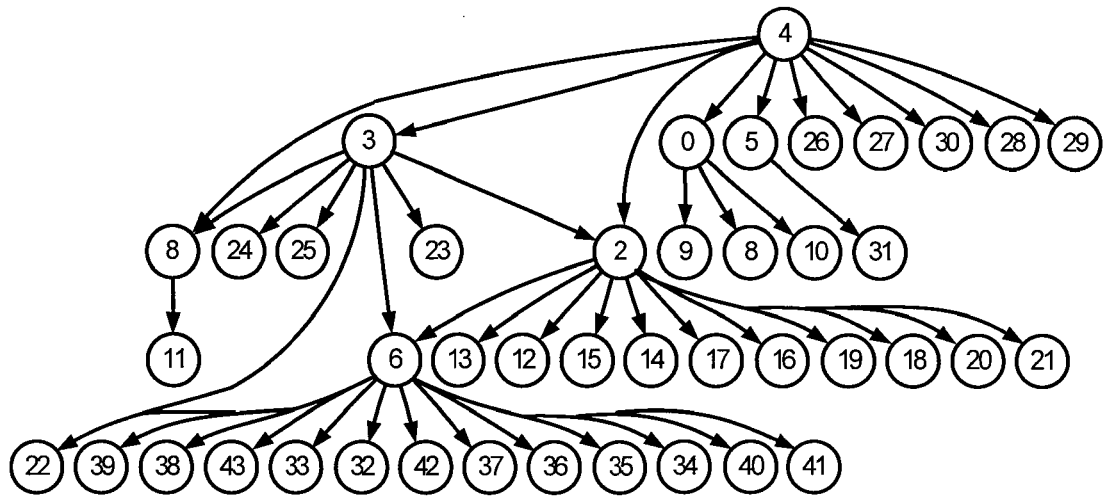
FIGS. 12A-C are graphical representations of tree structures during the process of linearizing an input collection for generation of the structured, paginated document in accordance with the present invention.

Like the hierarchal creation unit 602, the graph creation unit 604 has an input coupled to receive the wiki page address. The graph creation unit 604 creates a wiki linkage graph using the wiki page address as input. The wiki linkage graph is a directed graph of the different web pages referenced by the input wiki page address. The connections between nodes represent links between the different web pages in the wiki. One example of crawling web pages for an example wiki is shown in FIG. 12A as wiki linkage graph G. This graph is a directed graph. The example graph G looks very much like a tree. Only very few nodes do not satisfy the requirement for a tree node, namely having only one incoming edge. The nodes 1, 2, 6 and 22 violate the tree node requirement. This wiki linkage graph G is output by the hierarchal creation unit 602 to the weighting unit 606.

The weighting unit 606 receives the output of the hierarchal creation unit 602 and adds weightings to each of the nodes in the wiki linkage graph G. These weightings are later used by the arborescence unit 608 to create a tree structure and prune the tree. The wiki linkage graph G output by the graph creation unit 604 does not include any weights. In order to compute arborescence, weights have to be associated with the edges of the graph. In one embodiment, weights are assigned using the data contained in the history log file of the wiki to define costs for going from one wiki page to another. In another embodiment, weights are assigned by determining who created the page and how often did the ownership change between nodes. For example, the parent node was created by user 1, a child node by user 2, and the edge between the nodes also by user 2. That means there is one owner switch and a cost of 1 is assigned to that edge. If parent and child nodes and the edge are created by the same user the cost is 0. A maximum cost of 2 is assigned if nodes and edge are created by different people. Those skilled in the art will recognize that there is a variety of other ways of assigning costs such as analyzing time stamps or frequency of access. For certain subsets of the time, author, wiki linkage, content structure and context separate metrics could be defined. For example, the user preferences are also input to the weighting unit 606 as shown in FIG. 6. Thus, by providing different weightings, the analyzer 106 can identify content according to time, author, wiki linkage, content structure and context. Examples include: Print all edits done after or before a certain date; Print all content units with most frequent access; Print all content units edited by a certain author; Select content edited by the last creating author of a page or the author that initially created the page in the first place; Assign cost for edges in wiki graph by measuring frequency of change in authorship for a content unit and extract subgraph with minimal cost; Assign cost in wiki graph by measuring numbers of different authors editing one connection where connection is an edge in the graph and the two end nodes and extract subgraph with minimal cost; Print only a certain part of the wiki graph, e.g. only certain levels or paths in its arborescence; Print certain parts of the wiki content structure, e.g. all first and second level section headings and their following paragraphs not sections at third level and higher; Collapse content depth from N to M levels; Print parts of the wiki that are relevant to the keyword; Print parts of the wiki that are relevant to a certain topic; Importance weighting can be assigned to nodes in the wiki graph or the content structure graph e.g., the oldest page on the wiki is almost always the best introductory page; Consider companies organizational structure when assigning weights to the graph, e.g. president's edits have higher weights than employees edit; Tags are a way for the user to add context to the created content; and Content associated with certain tags can be extracted.

Figure 12B:
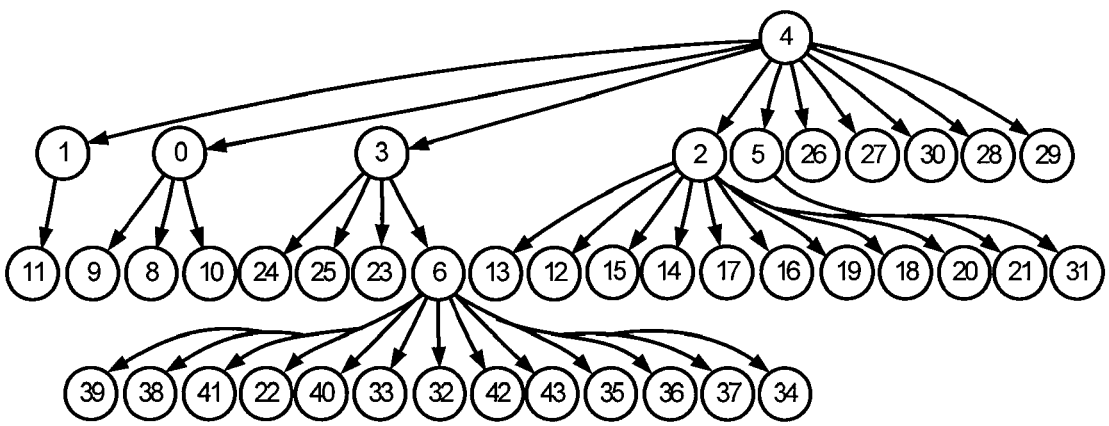

The arborescence unit 608 is coupled to the weighting unit to receive the weighted graph G from the weighting unit 606 and generates an arborescence graph A. In one embodiment, arborescence graph A is created by pruning a graph back to a tree by extraction of minimal spanning trees that are defined as follows: Given a connected, undirected graph, a spanning tree of that graph is a subgraph which is a tree and connects all the vertices together. In case of a weighted, connected, undirected graph a minimum spanning tree or minimum weight spanning tree is then a spanning tree with weight less than or equal to the weight of every other spanning tree. A wiki linkage graph is a directed graph, i.e. the concept of a minimum spanning tree is not directly applicable since that is only defined for an undirected graph. A subgraph of a directed graph, however, which is a tree and connects all the vertices together, is called arborescence. The arborescence unit 608 extracts an arborescence from a weighted, directed, connected graph such as using an algorithm of Kleinberg and Tardos as known to those skilled in the art. FIG. 12B shows an arborescence A produced using the cost assignment described above from graph G of FIG. 12A. In case the graph G has more than one connected component a forest of trees (on arborescence for each component) is computed.

Referring back to FIG. 5, the linearizer 316 has an input coupled by signal line 502 the output of the analyzer 106 and an output coupled to the layout selector 318. Such a linearization step can be performed automatically by an algorithm, or with manual input from a user. Manual input could include selection of certain content units for printing, or choosing from a selection of predefined content selection choices, e.g. most "recent edits" or "edits from author 1". One option is to take the output from the analyzers and generate several "related" formatted outputs that each differ, e.g., in weights to the different wiki space dimensions. Users can then select "mores like this" to explore the space of layouts before printing. The linearizer 316 also adds instructions used by the layout selector 318 to include traditional document structure information such as section numbers and table of content as well as wiki navigation information in the final rendered form. Wiki navigation may include navigation information from individual wiki pages or information extracted from a wiki linkages model. Assuming the wiki graph structure is a tree then linearization of wiki content into one XHTML file can be performed by hierarchically inserting the pages as "subsection pages" (depth-first-insertion). While present invention uses a depth-first methodology on a tree structure to perform linearization, those skilled in the art will recognize that the present invention may employ other linearization such as via breadth-first, a mix of depth- and breadth-first, and manually by the user.

Figure 7:
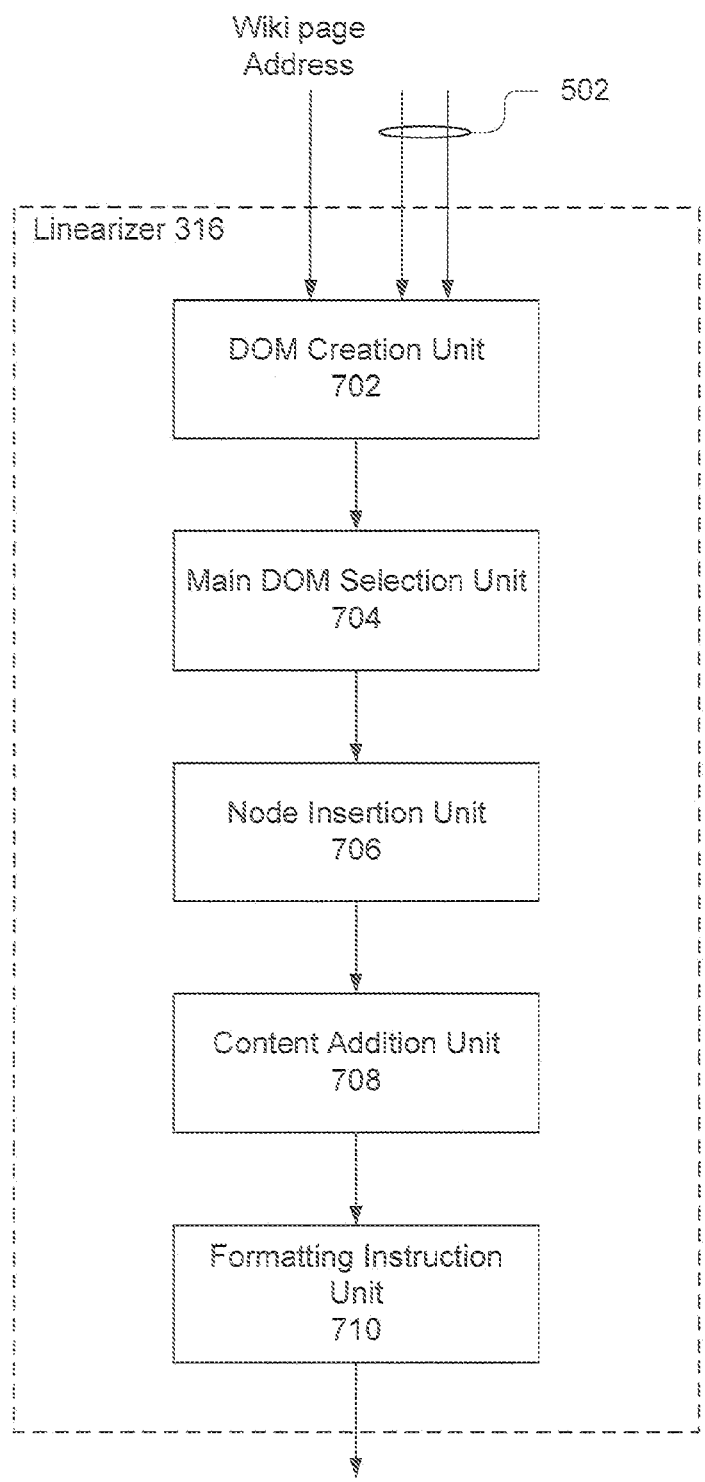
FIG. 7 is a block diagram of an embodiment of a linearizer in accordance with the present invention.

Referring now also to FIG. 7, a more specific embodiment of the linearizer 316 of the present invention is described. This embodiment of the linearizer 316 comprises a Document Object Model (DOM) creation unit 702, a DOM selection unit 704, a node insertion unit 706, and a content addition unit 708 and a formatting instruction unit 710.

The Document Object Model (DOM) creation unit 702 has inputs coupled to receive the wiki page address, the hierarchical data (tree T) from the analyzer 106 and the arborescence graph A from the analyzer 106. With these inputs the DOM creation unit 702 generates a DOM model. In one embodiment, the DOM creation unit 702 controls a second crawling of the wiki following a wiki-link that has a link in the arborescence graph A and the content of the wiki page associated with the link inserted as a new node at the place of the original link. In order to preserve the hierarchical structure of the insertion process a DOM model is created for each wiki page. The DOM model created is output by the DOM creation unit 702 to the DOM selection unit 704.

The DOM selection unit 704 has an input coupled to the output of the DOM creation unit 702. The DOM selection unit 704 identifies and selects one DOM wiki page corresponding to the root of node A as the Main DOM. This content fetching starts with the DOM model associated with the wiki page that represented by the root node of the arborescence.

The node insertion unit 706 has an input coupled to the output of the DOM selection unit 704. The node insertion unit 706 processes each of the nodes of the tree by replacing the nodes with their corresponding content. The node insertion unit 706 follows the edges of graph A and inserts DOM nodes into the Main DOM. In order to preserve the hierarchical structure of the insertion process a DOM model is created for each wiki page. Insertion of DOM nodes for a wiki page means appending a child node containing the entire inserted wiki page DOM node to the original link node.

The content addition unit 708 has an input coupled to the output of the node insertion unit 706. The content addition unit 708 fetches external content corresponding to the nodes, creates a visualization of the content, and then inserts the content into the Main DOM. One characteristics of the wiki is that material such as PDF documents or images are included via an http link into the wiki content. That means they are seen as attachments to the wiki. Back links from those attached nodes do not exist. In one embodiment, the present invention fetches the content of those attachments and converts it into some image form, (e.g. a thumbnail of an image or a thumbnail of the first page of a PDF document) or extracts a short text summary and insert that summary as a new node into the DOM tree. An image is then included using and <img> tag into the synthesized wiki.

Figure 12C:
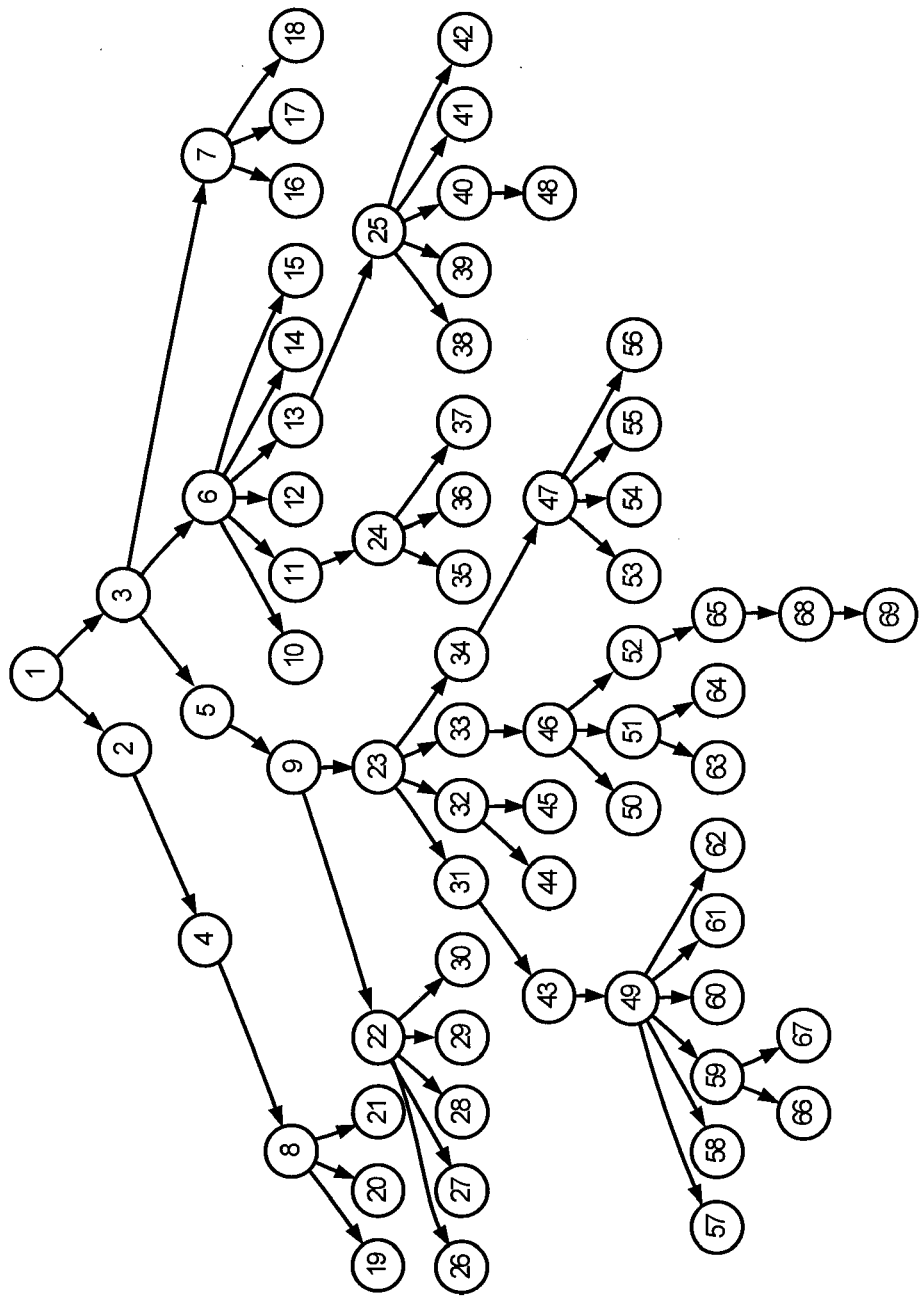

The formatting instruction unit 710 has an input coupled to the output of the content addition unit 708. The formatting instruction unit 710 inserts tags to support paper navigation of the content and formatting instructions for rendering of the content. In order to include tags helpful for creating traditional document layout information such as section numbers, paragraph indents and table of contents, the content is broken up into classical document units of sections and paragraphs. In one embodiment, the output of the content addition unit 708 is a highly hierarchically structured XHTML file with various levels of hierarchy. To create section and paragraphs some parts of the hierarchy needs to be flattened, such as nested <div> tags. On the other hand, serial tags like <h1>, <h2>, <h3>, etc., may need to be translated into some hierarchical interpretation for creation of a section numbering and table of contents. The smallest coherent unit is a paragraph. So the complex DOM model from the DOM creation unit 702 is flattened down to paragraph units. Then structure for adding section numbering and table of contents is added. To do the later part, an ordered section tree T is created (see FIG. 12C) that means the children of each node are ordered. The final synthesized wiki contains information maintained from web navigation, such as places where link content was inserted and table of contents from individual wiki pages, as well as classical document layout information for linearized formatting on paper, such as section numbering.

Referring back to FIG. 5, the layout selector 318 is shown as coupled to receive data (e.g., an XHTML file) from the linearizer 316 and output it to the user interface/preview unit 320. The layout selector 318 is also coupled to the template creator 504 to receive a style sheet and has an input to receive user preferences. One particular advantage of the present invention is that depending on application, task, wiki-familiarity of a user or personal preference, the layout of the wiki content may vary. If a technical report has to be created for an audience who has not had any interaction with the electronic wiki, then no wiki navigation links are included in the layout. If one of the wiki authors would like to create a printout with highlighted recent changes, display of wiki navigation information may be preferred. To accommodate various user needs, the mix between conventional document structure and including wiki navigation information is provided in a scalable form, from no navigation to a lot of navigation, to enable the user to pick a certain mix the amount of wiki navigation information in the layout is made scalable.

The template creator 504 is an application in which templates can be created for various levels of wiki navigation that are inserted in the print layout. The template creator 504 includes software for generating a GUI that displays allows the user to select the attributes associated with each level of wiki navigation that is included in the output. The template creator 504 provides these parameters to the layout selector 318 which in turn creates an output consistent with the parameter settings. In one embodiment, the template creator 504 outputs style sheets that are used by the layout selector 318 in generating the output.

Figure 11B:
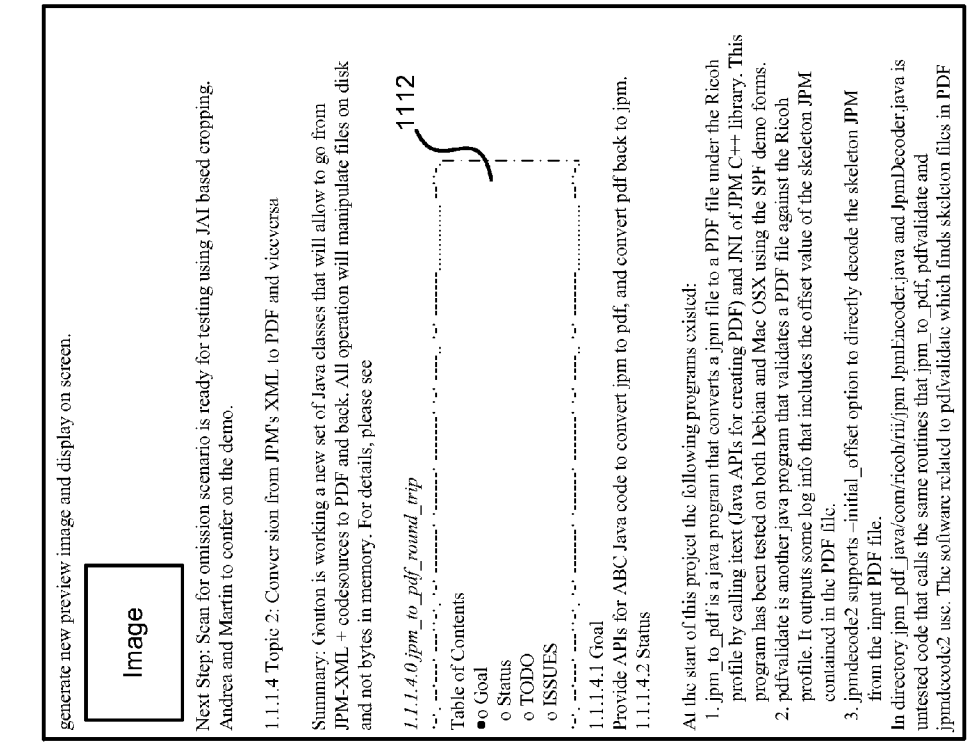
Figure 11C:
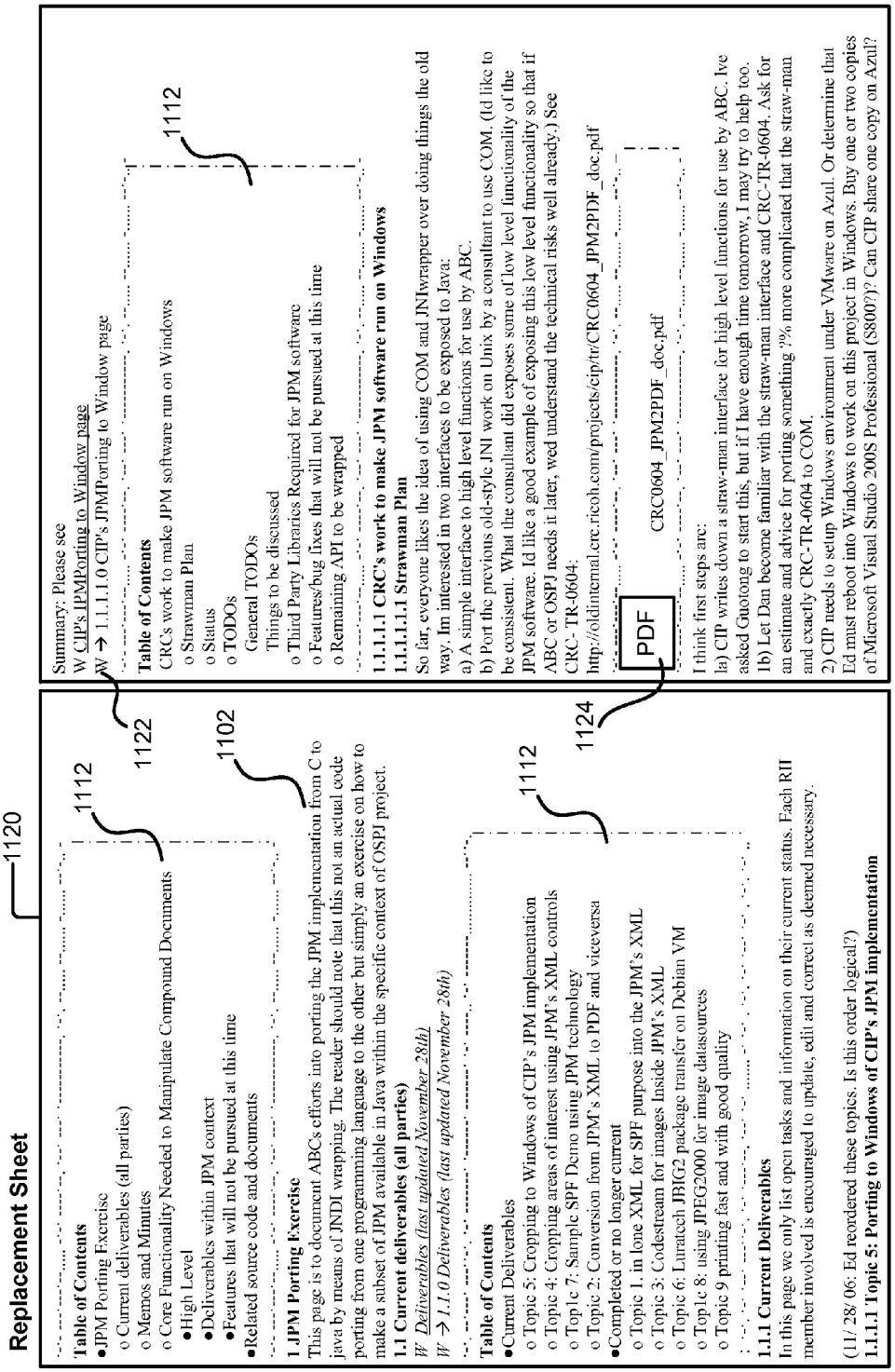

In one embodiment, the layout selector 318 generates four levels each with an increasing level of wiki navigation information. Using style sheets, different views of the wiki content can be created. The four different views include various levels of information following classical document layout and wiki navigation conventions. The first view suppresses all wiki navigation information and looks rather like a traditional document. An example is shown in FIG. 11A. The document 1100 starts with a table of contents and includes paragraphs 1102 of text. The individual sections are numbered. The second view includes some wiki navigation information by signaling insertion points for wiki pages through inclusion of wiki-page-specific table of contents 1112 at the top of the inserted content. An example is shown in FIG. 11B as document 1110. The third view includes some wiki navigation information by signaling insertion points for wiki pages through icons 1122, 1124 and wiki-page-specific table of contents 1112 at the top of the inserted content. An example is shown in FIG. 11C as document 1120. The fourth view includes more information to help identify from which wiki page a specific set of content came from through color codes 1132, 1134 and 1136. An example is shown in FIG. 11D as document 1130. Each color 1132, 1134 and 1136 reflects a level of hierarchy in the wiki graph in FIG. 12B. In one embodiment, a table of wiki pages is added at the beginning of the document displaying the associated color codes used in the following. The table reflects the structure contained in the arborescence. Links that are present in the wiki graph, but not in the arborescence are displayed in differentiating formatting style. In a fifth view as shown in FIG. 11E, the document 1140 also includes indexes such as barcodes 1146 and thumbnail image 1148 of external content. While the present invention has been described above with specific formatting for the attributes of the different views, those skilled in the art will recognize that these are provided only by way of example, and various other ways to show the metadata in a visually distinct manner may be used.

The user interface/preview unit 320 is coupled to the output of the layout selector 318 and generates a graphic representation of the output. This graphic representation is presented by the user interface/preview unit 320 to the user, and the user interface/preview unit 320 accepts input from the user. The user interface/preview unit 320 accepts changes to the user selections and preferences. For example, in one embodiment, the user can modify the tree structure in table of wiki pages, and open and close wiki pages as in a web browser. Once the user has modified the printing process as desired, the output is send to the renderer 322.

The renderer 322 is coupled to the user interface/preview unit 320 or directly coupled to the layout selector 318. The render receives the paginated document and metadata and renders the document into a printable or displayable format. The rendered may be any one of a number of conventional print engines in one embodiment.

Methods

Figure 8:
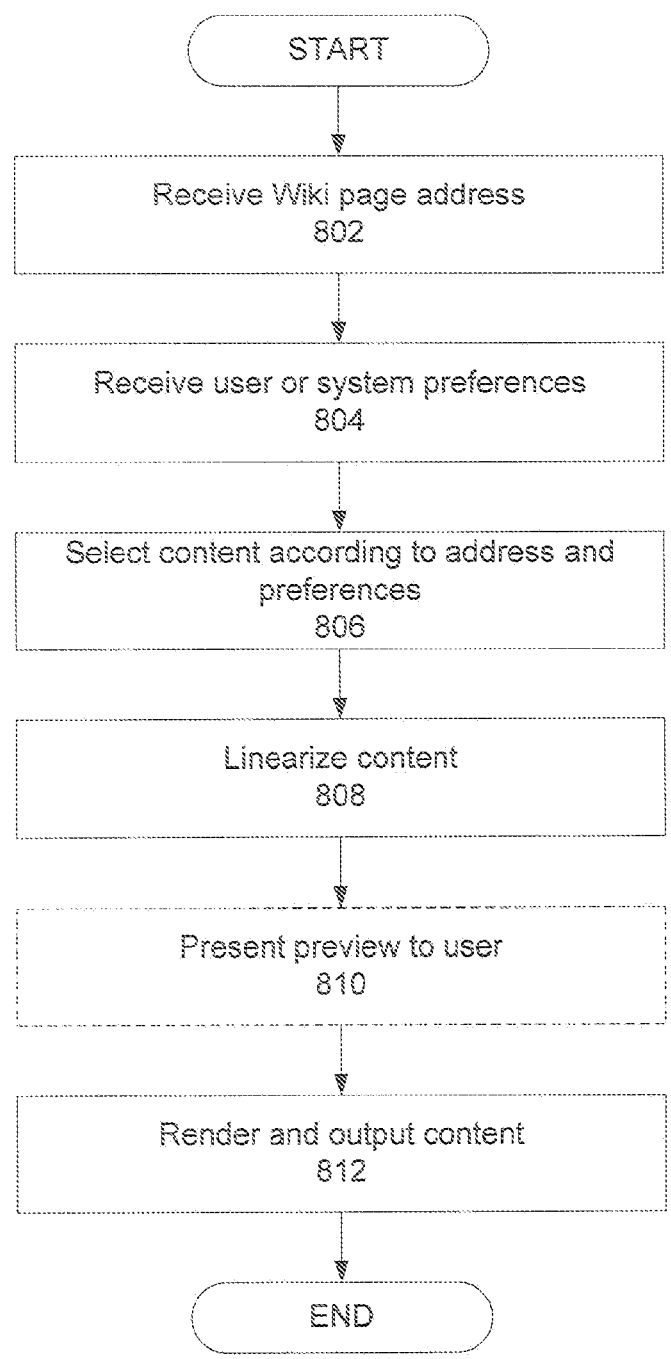
FIG. 8 is a flow chart of an embodiment of a method for converting a collection of data to a structured, printable and navigable format in accordance with the present invention.

Referring now to FIG. 8, an embodiment for converting a collection of data to a structured, printable and navigable format in accordance with the present invention will be described. The method begins by receiving 802 a wiki page address. Next, the system 100 receives 804 user or system preferences. The system 100 then selects 806 content based upon the wiki address and preferences that have been received. For example, the system 100 crawls links and other addresses at the received webpage address and selects portions of the information at such other addresses for inclusion. Then the system 100 formats and linearizes 808 the content. The wiki content can then be presented 810 to a user as a preview of what will be output. In one embodiment, the presentation is a static window of what will be output. In another embodiment, the presentation is in a dynamic window in which the user can provide additional input to adjust or change the user and/or system preferences received in step 804 and repeat the steps of selecting 806 the content and formatting and linearizing 808 content with the input the user and/or system preferences. As has been noted above, this presentation step 810 is optional. Finally, the method renders and outputs 812 the content, and the method is complete.

Figure 9:
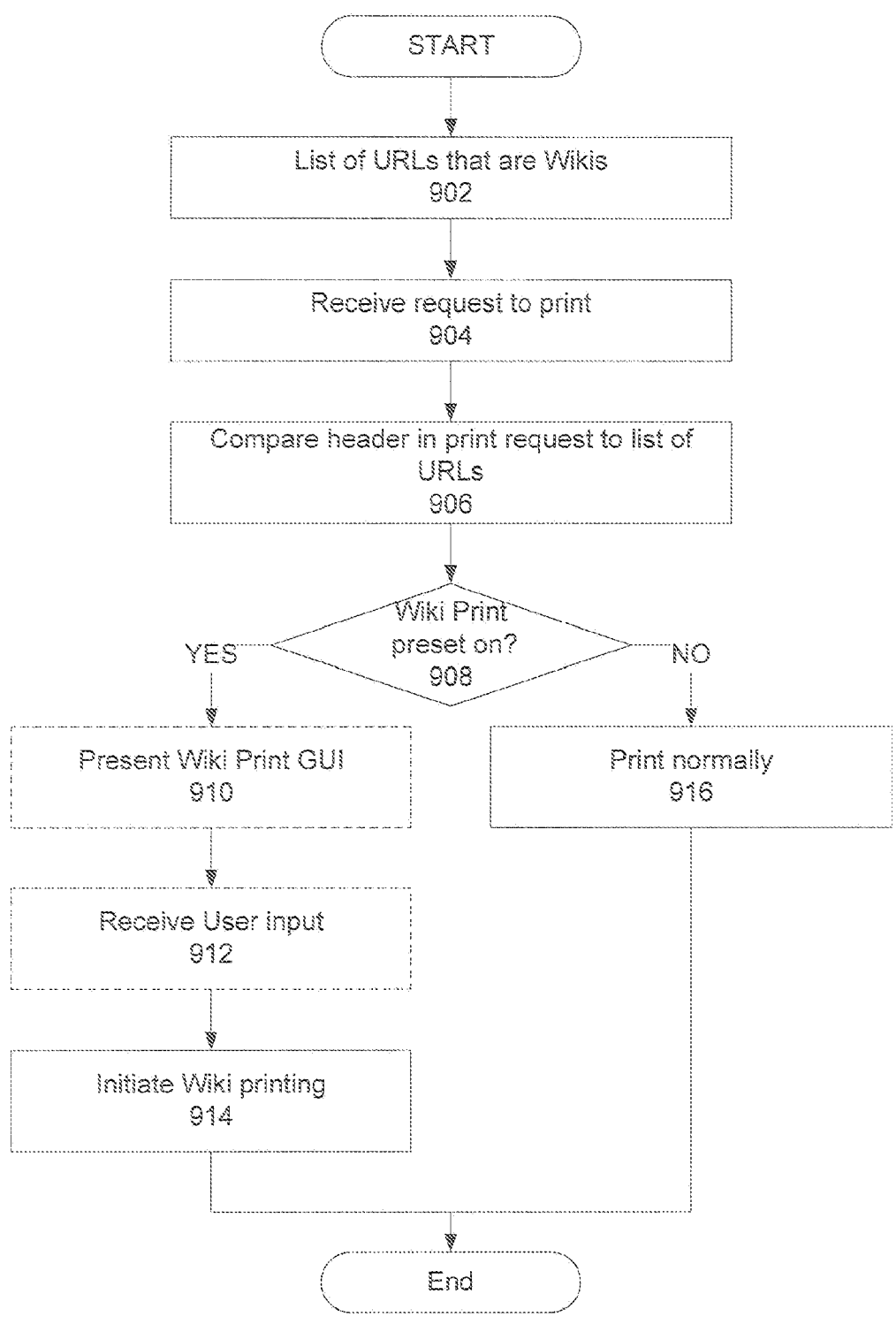
FIG. 9 is a flow chart of an embodiment of a method in accordance with the present invention for use as part of a printer driver.
Figure 10:
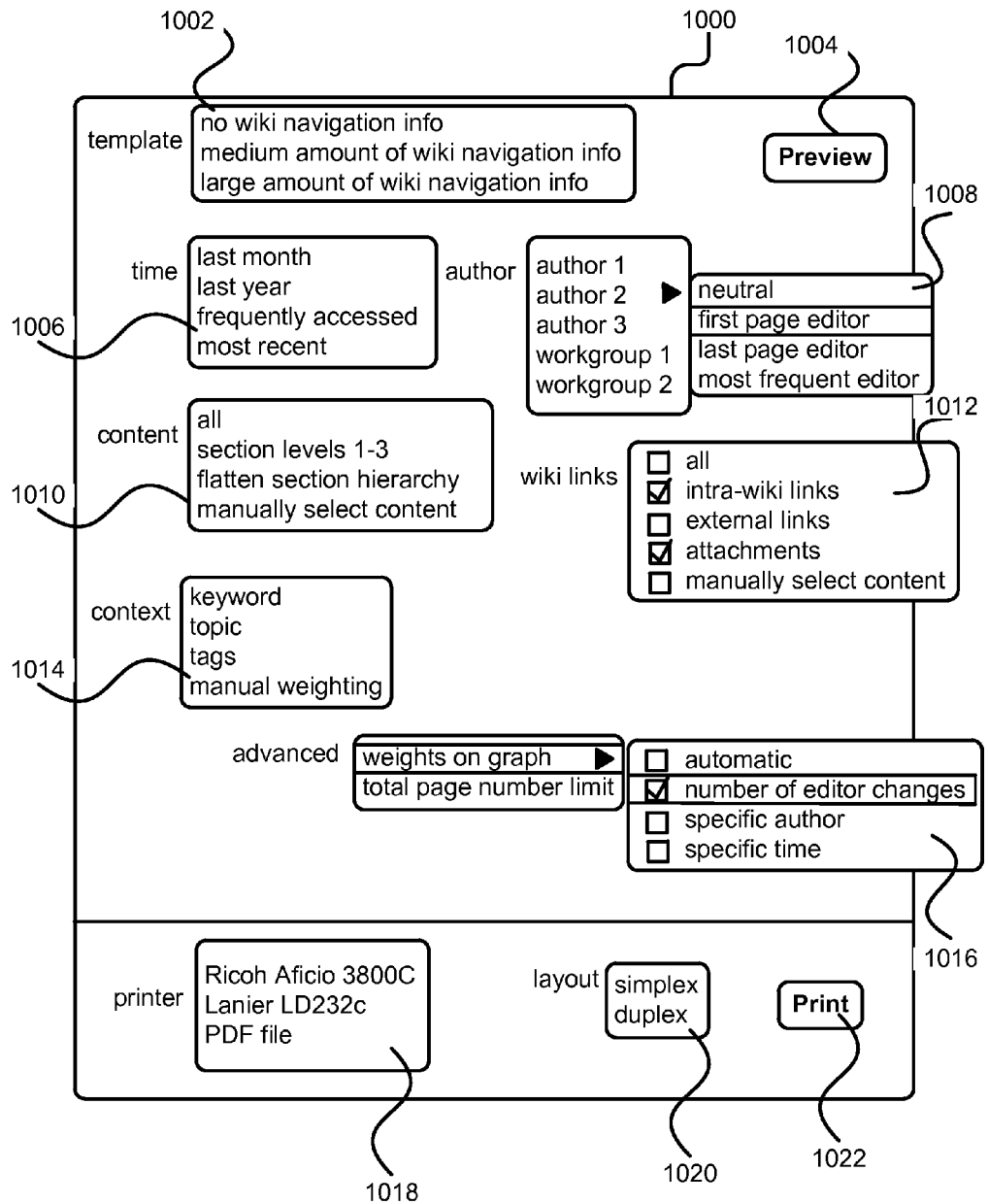
FIG. 10 is a graphical representation of an example of a user interface for wiki printing in accordance with the present invention.

FIG. 9 is a flow chart of an embodiment of a method in accordance with the present invention for use as part of a printer driver. In addition to utilizing some of the steps described above in with reference to FIG. 8, this method includes additional steps uniquely adapted for the inclusion of the present invention within a printer. The print driver can recognize that the underlying source is a wiki and therefore can provide the additional features as described above. The method begins by receiving and storing 902 a list of URLs that are wikis. This step can be performed in advance or segregate for the remaining steps which are performed proximate in time to printing. Then the system 100 receives 904 a request to print one of the wikis. When the browser sends a print request it includes the source URL in the symbolic data. The system 100 compares 906 the header in the print request to the list of URLs. In one embodiment, a simple lookup table is used to determine whether that source is a wiki. In other embodiments, more sophisticated methods use markers such as standard templates to make the determination for unknown URLs. Next the method determines whether the user has set the wiki print function has enabled. If not, the method performs a normal print operation 916 and is complete. If so the method will attempt to perform a wiki printing function. In one embodiment, after it has been determined that wiki printing is enabled, the method presents 910 a wiki print GUI to the user and receives 912 user input. An example embodiment for the wiki print GUI or dialog box is shown in FIG. 10. The dialog box 1000 includes a number of pull down menus 1002, 1006, 1008, 1010, 1012, 1012 and 1016 that allow the user specify different attributes related to the meta data and 5 parameters affecting wiki content. Specifically, the user can specify the template used, a time frame, an author, content, which links will be included, context information and other advanced features. The dialog box 1000 also includes other conventional selection options such as the output device 1018, the layout 1020, a print button 1022 and a preview button 1004. Those of ordinary skill in the art will recognize that steps 910 and 912 are optional and therefore depicted in FIG. 9 with dashed lines. Finally, the print driver initiates 914 wiki printing. This includes steps similar to those described above with reference to FIG. 8.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. For example, the wiki printout can be used as an interface into the online wiki. In this example case bar codes are printed in addition to the original wiki content to allow access into attachments, wiki sections etc. A mixed media access pattern into the linearized wiki version and from there to the original version is possible. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for converting a collection of data to a structured, printable and navigable format, the method comprising:
   receiving a reference to the collection of data;
   generating a set of references to individual items contained in the collection;
   analyzing the individual items in the collection to generate a representation of hierarchical relationships between the individual items;
   analyzing a plurality of parameters associated with each individual item in the set of references to modify the representation of hierarchical relationships between the individual items by weighting each of the individual items based at least in part on a cost of reaching the individual items, the cost being associated with the parameters including authorship information;
   generating linearized content by creating a document object model having a plurality of nodes, adding at least some of the collection of data to the document object model including adding data to form a new node of the document object model, and adding formatting instructions to the document object model based on the representation of hierarchical relationships between the individual items, wherein adding the data to form the new node includes fetching content of an attachment corresponding to an existing node of the plurality of nodes, processing the attachment and inserting the processed attachment as the new node; and
   formatting the linearized content to generate a structured printable document, the structured printable document including a marker that reflects a level of hierarchy of the new node in the document object model and an index of the attachment.

2. The method of claim 1, further comprising receiving preferences, and using the preferences in analyzing the individual items.

3. The method of claim 1, further comprising presenting to a user a preview of the linearized content.

4. The method of claim 3, wherein the preview is a static window of what will be output.

5. The method of claim 3, wherein the preview is a dynamic window in which the user can provide additional input to modify the linearized content, and further comprising receiving input from the user.

6. The method of claim 1, further comprising rendering the linearized content.

7. The method of claim 1, wherein the reference is a wiki page address.

8. The method of claim 1, wherein analyzing the individual items includes generating a tree representing a hierarchical order of the individual items.

9. The method of claim 1, wherein analyzing the individual items includes:
   organizing the individual items into a plurality of nodes; and
   associating wiki data with at least one of the plurality of nodes.

10. The method of claim 1, wherein analyzing the individual items includes:
    creating a directed graph of different content related to the reference;
    weighting the directed graph using a cost for traversing an edge of the directed graph to generate a weighted graph; and
    creating an arborescence graph from the weighted graph by pruning the weighted graph by extraction of minimal spanning trees.

11. The method of claim 1, wherein the parameters include time, author, item linkage, content structure and context.

12. The method of claim 1, wherein adding at least some of the collection of data comprises:
    selecting a node as a main node for the document object model; and
    inserting the at least some of the collection of data for the plurality of nodes in the document object model.

13. The method of claim 1, wherein generating the linearized content includes creating an intermediate tree structure representing the individual items.

14. The method of claim 13, wherein generating the linearized content includes modifying the intermediate tree structure to an ordered tree indicating that children of each node are ordered.

15. The method of claim 1, wherein the structured printable document includes formatted content and wiki navigation information.

16. The method of claim 1, wherein the structured printable document includes visually distinct formatting for wiki navigation information.

17. The method of claim 16, wherein the wiki navigation information includes one from the group of an author of content, a time when the content was added, link information, page content structure and context.

18. A method for converting a collection of data to a structured, printable and navigable format, the method comprising:
    receiving a request to print the collection of data;
    determining whether a data collection print function is enabled;
    if the data collection print function is enabled,
      analyzing individual items contained in the collection of data and adding metadata from the collection of data having a plurality of parameters based upon a page address;
      generating linearized content by creating a document object model having a plurality of nodes, adding at least some of the collection of data to the document object model including adding data to form a new node of the document object model, and adding formatting instructions to the document object model based on analysis of the individual items, wherein adding the data to form the new node includes fetching content of an attachment corresponding to a node, processing the attachment and inserting the processed attachment as the new node;
      formatting the linearized content to generate a structured printable document, the structured printable document including a marker that reflects a level of hierarchy of the new node in the document object model and an index of the attachment; and
      printing the structured printable document.

19. The method of claim 18, wherein the request to print includes a source uniform resource locator (URL) and further comprising:
    receiving and storing a list of URLs that are collections of data; and
    comparing the request to print to the list of URLs.

20. The method of claim 18, further comprising:
    presenting to a user a preview of the linearized content; and
    receiving input from the user.

* * * * *